United States Patent
Haynold

(10) Patent No.: US 10,268,219 B1
(45) Date of Patent: Apr. 23, 2019

(54) THERMOSTAT ADAPTER

(71) Applicant: Oliver Markus Haynold, Evanston, IL (US)

(72) Inventor: Oliver Markus Haynold, Evanston, IL (US)

( * ) Notice: Subject to any disclaimer, the term of this patent is extended or adjusted under 35 U.S.C. 154(b) by 1196 days.

(21) Appl. No.: 14/450,278

(22) Filed: Aug. 3, 2014

Related U.S. Application Data

(60) Provisional application No. 61/867,019, filed on Aug. 16, 2013, provisional application No. 61/863,381, filed on Aug. 7, 2013.

(51) Int. Cl.
  *G05D 23/00* (2006.01)
  *G05D 23/19* (2006.01)
  *F25B 49/00* (2006.01)

(52) U.S. Cl.
  CPC .......... *G05D 23/19* (2013.01); *G05D 23/00* (2013.01); *F25B 49/00* (2013.01)

(58) Field of Classification Search
  CPC .......... F25B 49/02; F25B 49/00; G05D 23/00
  See application file for complete search history.

(56) References Cited

U.S. PATENT DOCUMENTS

| | | | | |
|---|---|---|---|---|
| 3,967,545 | A * | 7/1976 | Baker | F24F 7/06 4/213 |
| 4,032,069 | A * | 6/1977 | Cannella | G05D 23/32 236/46 R |
| 4,298,946 | A * | 11/1981 | Hartsell | G05D 23/1904 165/268 |
| 4,309,594 | A * | 1/1982 | Jones | F24H 3/0411 126/110 R |
| 5,039,010 | A | 8/1991 | Juntunen | |
| 5,598,349 | A | 1/1997 | Elliason | |
| 6,357,667 | B1 | 3/2002 | Young | |
| 6,622,925 | B2 | 9/2003 | Carner et al. | |
| 6,633,823 | B2 | 10/2003 | Bartone et al. | |
| 7,752,856 | B2 | 7/2010 | Kondou et al. | |
| 8,280,556 | B2 | 10/2012 | Besore et al. | |
| 8,463,453 | B2 | 6/2013 | Parsons | |
| 2004/0034484 | A1 | 2/2004 | Ewald et al. | |
| 2006/0007627 | A1 | 1/2006 | Lewis | |
| 2007/0140238 | A1 | 6/2007 | Auclair et al. | |
| 2012/0061480 | A1 * | 3/2012 | Deligiannis | G05B 15/02 236/51 |
| 2012/0248211 | A1 | 10/2012 | Warren et al. | |
| 2012/0273580 | A1 | 11/2012 | Warren et al. | |
| 2012/0325919 | A1 | 12/2012 | Warren et al. | |
| 2013/0125572 | A1 | 5/2013 | Childs | |

* cited by examiner

*Primary Examiner* — Ljiljana V. Ciric
*Assistant Examiner* — Alexis K Cox

(57) ABSTRACT

An adapter to connect an industry standard low-voltage thermostat to a central HVAC system with a mains-voltage fan coil unit. The adapter detects the operating conditions of the thermostat, and only switches a power connection to the fan coil unit on if it is capable of heating while in heating mode or cooling while in cooling mode.

7 Claims, 4 Drawing Sheets

PRIOR ART NOT CLAIMED

THERMOSTAT ADAPTER

FIELD OF THE INVENTION

This invention relates to the field of connecting a thermostat to a central HVAC system.

RELATED APPLICATIONS

This application claims priority from my provisional patent application 61,863,381 for an Energy-Price Optimizer filed on 7 Aug. 2013 and my provisional patent application 61,867,019 for a Thermostat Adapter filed on 16 Aug. 2013, which are hereby incorporated in full into this application.

PRIOR ART

The following is a tabulation of some prior art patent documents that appear relevant:

| U.S. Patents | | | |
|---|---|---|---|
| Pat. No. | Kind Code | Issue Date | Patentee |
| 5,039,010 | B1 | 1991 Aug. 13 | Juntunen |
| 5,598,349 | A | 1997 Jan. 28 | Elliason & Schnell |
| 6,357,667 | B1 | 2002 Mar. 19 | Young |
| 6,622,925 | B2 | 2003 Sep. 23 | Carner et al. |
| 6,633,823 | B2 | 2003 Oct. 14 | Bartone et al. |
| 7,752,856 | B2 | 2010 Jul. 13 | Kondou et al. |
| 8,280,556 | B2 | 2012 Oct. 2 | Besore et al. |
| 8,463,453 | B2 | 2013 Jun. 11 | Parsons |

| U.S. Patent Application Publications | | | |
|---|---|---|---|
| Publication Number | Kind Code | Publication Date | Applicant |
| 2004,003,4484 | A1 | 2004 Feb. 19 | Ewald et al. |
| 2006,000,7627 | A1 | 2006 Jan. 12 | Lewis |
| 2007,0140,238 | A1 | 2007 Jun. 21 | Auclair et al. |
| 2012,024,8211 | A1 | 2012 Oct. 4 | Warren et al. |
| 2012,027,3580 | A1 | 2012 Nov. 1 | Warren et al. |
| 2012,032,5919 | A1 | 2012 Dec. 27 | Warren et al. |
| 2013,012,5572 | A1 | 2013 May 23 | Childs & Rognli |

BACKGROUND

Large residential buildings, such as apartment complexes or student dormitories, as well as schools and offices are commonly equipped with central HVAC systems. Common configurations include one-pipe, two-pipe, and four-pipe systems. In all of these configurations, a heating and/or cooling medium that is most commonly water but for heating may also be steam, is centrally heated or cooled and then pumped through pipes throughout the building. The medium then flows through fan-coil unit ventilators where the heat or cold is partially transferred to the air in the rooms to be heated or chilled.

FIG. 1 shows a fan-coil unit ventilator 100 (in the following just 'fan-coil unit') for a two-pipe system as it is commonly installed in apartment buildings and similar structures. Its primary components are an electric fan 102 and a coil 104 that exchanges heat between the heating or cooling medium and the air forced through it by the fan 102. The unit is connected to mains power through hot wire 108 and neutral wire 110. A switch 106 installed in the unit allows the user to switch the unit on an off. If switched on, the switch 106 allows electricity to pass through wire 112, to the fan 102, setting it in motion. A central heating and/or cooling plant pumps the heating/cooling medium, typically water, into pipe 114. From there, a junction that may include a balancer valve diverts a certain amount of that water through pipe 118 into the coil 104. If the fan is operating and the water is hot, the air forced through the coil will be heated, and if the water is cold the air will be chilled. Then the water passes back through pipes 120 and 122 to the central plant to be heated or cooled again.

Such two-pipe systems are very popular, especially in older buildings but also in some new structures, because of their low cost of installation. The switch 106, which may also offer high and low settings instead of just on and off, gives the resident of each room a rudimentary level of control over the desired temperature. Alternatively to the two-pipe system shown, several fan-coil unit ventilators may be installed serially with the water exiting from one unit flowing into the next unit. This one-pipe system is not very popular anymore. Instead of the two pipes, one to and one from the heating plant, there may also be four pipes, with separate pipes for cooling and heating media from the plant and separate return pipes for each, which is known as a four-pipe system. The four-pipe system has the advantage over the two-pipe system that some rooms can be cooled while other rooms are being heated, whereas two-pipe systems are restricted to either heating or cooling for the entire building and thus require seasonal or more frequent changeovers between heating and cooling. In four-pipe systems, valves, which can be either manually or automatically actuated, need to shut off the flow of the cooling medium when heating is desired and the flow of the heating medium when cooling is desired.

The temperature control provided by a simple on/off or off/low/high switch is very crude, however. There is no thermostatic control provided. One solution is for users to operate the switch frequently according to the present room temperature, which is inconvenient and impossible to do while a room is not being occupied or the resident is busy or sleeping. The most common solution in practice thus is for the user to set the fan-coil unit to provide more heating or cooling than is desired and getting a more fine-grained control of the temperature by cracking a window open. This solution is grossly wasteful of energy invested for heating and cooling.

Over the past decades, thermostats for residential and commercial applications have made great progress. Traditionally, all a user could do with a thermostat was to set it into either heating and cooling mode, then set a temperature setpoint, and the thermostat would switch the heating or cooling on when the temperature was a certain amount below or above, respectively, the setpoint, and switch it off again when the temperature had increased or decreased, respectively, to a certain amount above or below the setpoint. Even this, of course, would be better than the method of switching a fan-coil unit on and then opening the window to regulate the temperature. Modern thermostats, however, have much more advanced functions. Even cheap thermostats now allow the user to set a schedule with different temperature setpoints for different times of the day. More advanced thermostats can be programmed through the Internet, automatically learn the user's schedule, sense automatically when someone is at home and predict return times, and my own Application 61,863,381 teaches a thermostat that finds a sophisticated optimal control strategy to maximize comfort and minimize cost based upon real-time energy prices, weather predictions, and other data.

These developments in thermostat controls have mostly passed by installations with fan-coil units, especially older installations where a retrofit would be necessary. Part of the reason is that almost all modern residential thermostats are designed to switch a low current of a safe voltage, usually 24 V AC, but fan-coil units need to be switched at higher currents and at mains voltage. There are some thermostats designed to switch mains voltage available, but they are much more expensive than standard low-voltage thermostats and typically offer few or none of the advanced functions of modern thermostats. Mains voltage thermostats are also difficult to install because the connection from the fan-coil unit to the thermostat must be safe for mains voltage and substantial currents, so that installation must be performed by a qualified electrician and often requires tearing walls and floors open to install code-compliant mains wiring. What is more, in a one- or two-pipe system that switches between heating and cooling, most mains voltage thermostats cannot automatically detect the changeover. If, for example, the thermostat is set to cooling but temperatures drop and the HVAC system is changed over to heating, the thermostat will not activate the fan-coil unit as temperatures drop. When temperatures happen to rise far enough that cooling would make sense, the thermostat will turn on the fan-coil unit, which, since the system is operating in heating mode, will raise the temperature even more, and the thermostat becomes stuck in this operating condition. It is, therefore, not surprising that few buildings with fan-coil units have retrofitted thermostats.

There are a few solutions available that enable the installation of a special low-voltage thermostat on a fan-coil unit. These solutions typically consist of a transformer, a printed circuit board containing one or more relays, a temperature sensor, and a specialized thermostat with a connection for the temperature sensor. The transformer and the printed circuit board are then installed in an enclosure in or near the fan-coil unit. Low-voltage signal and power wires are run from the transformer and the relay board to the thermostat and to the temperature sensor. This wiring requires a qualified electrician and is fairly time-consuming. Both the transformer and the printed circuit board must be mounted in a way that is safe and code-compliant for components that have exposed parts under mains voltage. The wiring is complicated and has to connect four new components, the thermostat, the relay board, the transformer, and the temperature sensor. The specialized thermostat will then use the signal from the temperature sensor, which is installed on the pipe 118 bringing heating/cooling medium into the fan-coil unit, to detect changeovers between heating and cooling and change its own mode accordingly. These solutions work, but they are complicated, expensive, and the specialized thermostats required usually offer much less advanced features than advanced standard thermostats for low voltage. Again, it is not surprising that this solution is not widely adopted and in particular that it is not widely retrofitted into existing installations.

US Patent Application 2012,027,3580 teaches a self-configuring low-voltage thermostat that can sense whether it is connected to a one-speed or a two-speed HVAC system, although it does not deal with the problem of mains-powered fan-coil units.

The reader will see that the present situation for controlling the operation of fan-coil units attached to central HVAC systems, in particular for retrofitting existing systems, is quite unsatisfactory. Many installed systems do not have any thermostats installed, and users regulate the temperature through opening windows. This is equally uncomfortable and wasteful. Existing solutions to retrofit thermostats to a fan-coil unit require mains-voltage wiring to the intended thermostat location; this is expensive, laborious, and messy, most mains-voltage thermostats are quite unsophisticated and expensive compared to low-voltage thermostats, and most mains-voltage thermostats don't solve the problem of changing the thermostat mode as a one- or two-pipe HVAC system is being switched over from heating to cooling or vice versa. Some alternative solutions allow for low-voltage wiring from the fan-coil unit to the thermostat and include a sensor to handle changeovers, but are expensive and consist of several components that are difficult to install and expose mains voltage, such as on the soldering points of a printed circuit board holding relays.

None of the existing solutions allow for more advanced communications between the fan-coil unit and the world outside of it. The central HVAC unit is not aware when more fan-coil units come on or go off and thus cannot anticipate their demand for heating or cooling power but has to observe the temperature of the returning heating or cooling water. Existing solutions do not allow to charge residents of each unit for the amount of heat and cooling they consume in order to provide an incentive to conserve energy, and they certainly do not allow the integration of real-time pricing where cooling power is priced differently depending upon the current real-time price of electricity.

SUMMARY

According to one embodiment, an adapter to connect an industry-standard low-voltage thermostat to a central HVAC system that may be a two-pipe system with a mains-voltage fan-coil unit. Additional embodiments are shown.

Advantages

Some advantages of some embodiments include:
a) The adapter allows the use of industry-standard, low-voltage thermostats, which are cheaper than mains voltage thermostats or specialized thermostats for fan-coil units.
b) The only part of the adapter that is exposed to mains voltage is as easy to install as a light switch, requiring only three connections to mains wires.
c) New innovations, such as self-learning thermostats, thermostats with a particularly intuitive user interface, thermostats with particularly advanced energy-saving features, or networked thermostats, are typically available first as low-voltage thermostats, and the adapter makes these innovative thermostats available for fan-coil units.
d) No mains wiring between the adapter and the thermostat is required, eliminating the need to open walls or floors for installation.
e) The ease of retrofitting thermostats using the adapter makes it possible to convert large residential buildings to thermostat use, leading to big cost savings and reduction in pollution.
f) When a one- or two-pipe system provides heat, the fan will only be activated when the thermostat signals heating; when it provides chilling, the fan will only be activated when the thermostat signals cooling.
g) For thermostats that allow both heating and cooling setpoints to be set at the same time, the user does not need to switch the thermostat from heating to cooling mode.
h) The adapter can signal changeovers between heating and cooling to the thermostat in a way that is compatible with existing thermostats and does not need additional wires.

i) The adapter's automatic handling of changeovers between heating and cooling enables buildings to switch more frequently between heating and cooling, whereas with thermostats that need to be switched manually, typically buildings are restricted to changing over once per year.

j) The adapter allows the use of an affordable, industry-standard thermostat with discrete operating states to control a modern fan-coil unit with continuous fan control.

DRAWINGS—REFERENCE NUMERALS

Figure 1:
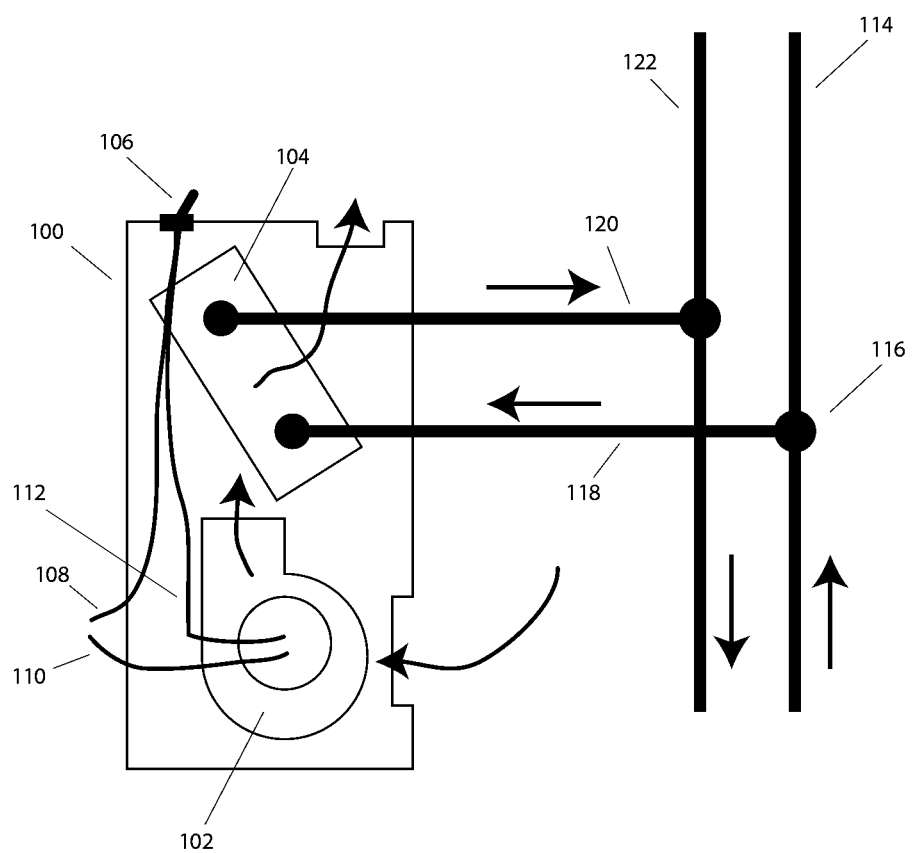
FIG. 1—PRIOR ART NOT CLAIMED shows a fan-coil unit ventilator.

100 Fan-coil unit ventilator
102 Electric radial fan
104 Heat exchange coil
106 Switch
108 Mains power hot wire
110 Mains power neutral wire
112 Mains power switched wire
114 Water pipe from central heating/cooling plant
116 Junction/balancer valve
118 Water pipe into fan-coil unit
120 Water pipe out of fan-coil unit
122 Return water pipe to central heating/cooling plant
200 Adapter
202 Black adapter wire—mains power hot wire in
204 White adapter wire—mains power neutral
206 Red adapter wire—mains power hot wire to fan-coil unit
208 Twist-on wire connector—mains power to fan-coil unit
210 Twist-on wire connector—mains power neutral
212 Twist-on wire connector—mains power in
214 Mains power hot wire
216 Mains power neutral wire
218 Fan-coil unit neutral wire
220 Fan-coil unit hot wire
222 Water pipe into fan-coil unit
224 Temperature sensor
226 Strap
228 Thermostat terminal connectors
230 Thermostat cable
300 Mains power in
302 Mains power neutral
304 Mains power out
306 Terminal Rh—Power heat
308 Terminal W—Signal heat
310 Terminal Rc—Power cool
312 Terminal Y—Signal cool
314 Terminal C—Common neutral
316 Transformer mains voltage to thermostat voltage
318 Diode
320 Capacitor
322 Linear voltage regulator
324 Capacitor
326 Integrated circuit—Microcontroller
328 Integrated circuit—Temperature sensor
330 Double-pole double-throw relay
332 Resistor
334 Resistor
336 Diode
338 Resistor
340 Single-pole single-throw relay
400 Terminal Rh—Power heat
402 Terminal W—Signal heat
404 Terminal Rc—Power cool
406 Terminal Y—Signal cool
408 Terminal C—Common neutral
410 Diode
412 Diode
414 Capacitor
416 Integrated circuit—Linear voltage regulator
418 Capacitor
420 Integrated circuit—Microcontroller
422 Relay
424 Relay
426 Resistor
428 Diode
430 Resistor
432 Resistor
434 Diode
436 Resistor

DETAILED DESCRIPTION—FIGS. 2 AND 3

First Embodiment

Installation

Figure 2:
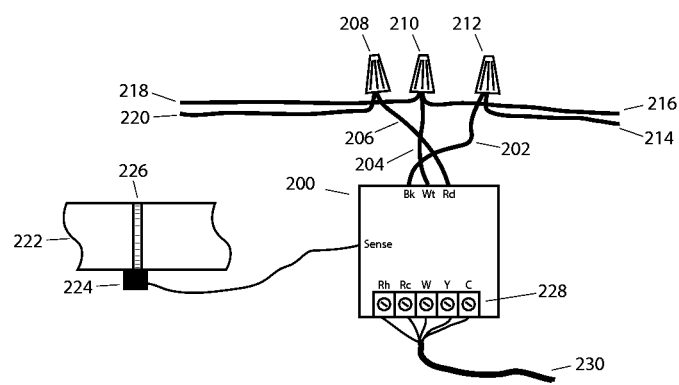
FIG. 2 shows the installation of one embodiment of the adapter.

FIG. 2 shows the first embodiment, the adapter zoo meant for installation on a two-pipe fan-coil unit, as it is connected to the fan-coil unit and a thermostat. The installation will usually be made within the fan-coil unit or in an electric utility box close to it. The adapter zoo is enclosed in a case of non-conducting polymer. Alternatively, it may be enclosed in a grounded metal case. This makes the adapter safe to handle and easy to install as the only parts accessible by the installer that are connected to mains power are the three wires 202, 204, and 206. Their color coding and function is equivalent to the convention for light switches and similar devices, making installation very easy and intuitive for the installer.

The installer has cut the wires 108 and 110 in FIG. 1. The hot wire 108 coming from mains is now wire 214 in FIG. 2, and the neutral wire 110 coming from mains is now wire 216 in FIG. 2. The hot wire 108 going to the fan-coil unit is wire 220 in FIG. 2, and the neutral wire 100 going to the fan-coil unit is wire 218. The twist-on wire connector 210 connects the neutral wire 216 coming from mains power, the neutral wire 204 of the adapter, and the neutral wire 218 going to the fan-coil unit. The twist-on wire connector 212 connects the hot wire coming from mains power 214 to the adapter's mains hot wire 202. The twist-on wire connector 208 connects the switched hot wire 206 coming out of the adapter to the fan-coil unit's hot wire 220. Again, this is exactly how light switches, dimmers, and so on are usually wired up and may be accomplished by any electrician in a short time, and these are the only connections exposed to mains power.

The adapter zoo also has a temperature sensor 224, which is tied to the water pipe 222 leading into the fan-coil unit (118 in FIG. 1), by means of a strap 226. This temperature sensor enables the adapter to sense whether the two-pipe HVAC system is in heating or in cooling mode.

The adapter has a block of terminal connectors 228, which are connected to a thermostat cable, which leads to an industry-standard thermostat (not shown). All of these connections are low voltage and may safely be installed by someone not qualified as an electrician. The wire connections on the terminal connector 228 are labeled according to the industry-standard conventions for thermostat wires: Rh for heating power supply, Rc for cooling power supply, W for heating, Y for cooling, and C for common neutral to supply the thermostat with power. The thermostat can switch on heating by connecting Rh to W and it can switch on cooling by connecting Rc to Y. Virtually all industry-standard low-voltage thermostats now sold on the North American market have terminals marked with these letters, so installation is trivial. In other countries, the letters and associated color codings may be changed appropriately.

Operation

The adapter will work with the vast majority of industry-standard low-voltage thermostats and handle heating/cooling changeovers correctly for various types of thermostats.

The simplest thermostats have to be set manually into heating or cooling mode. In this case, if a changeover occurs and, for example, the thermostat is set to heating while the fan-coil unit provides cooling, the fan-coil unit will simply not operate. This is the correct behavior, since all that the thermostat in this situation can ask the fan-coil unit to do is to heat, and the fan-coil unit is not capable of doing so while chilled water is circulating.

More advanced thermostats have modes, often called Auto; where they automatically switch between heating and cooling. In this case, the fan-coil unit will operate either if the thermostat signals heating and the fan-coil unit carries hot water, or if thermostat signals cooling and the fan-coil unit carries chilled water. It will not operate if the thermostat's desired operation is the opposite of what can be achieved with the water temperature in the fan-coil unit.

Thermostats may also use the signal on the thermostat wires to determine whether the unit is currently in heating or cooling mode as described below.

Schematic and Internal Operation

Figure 3:
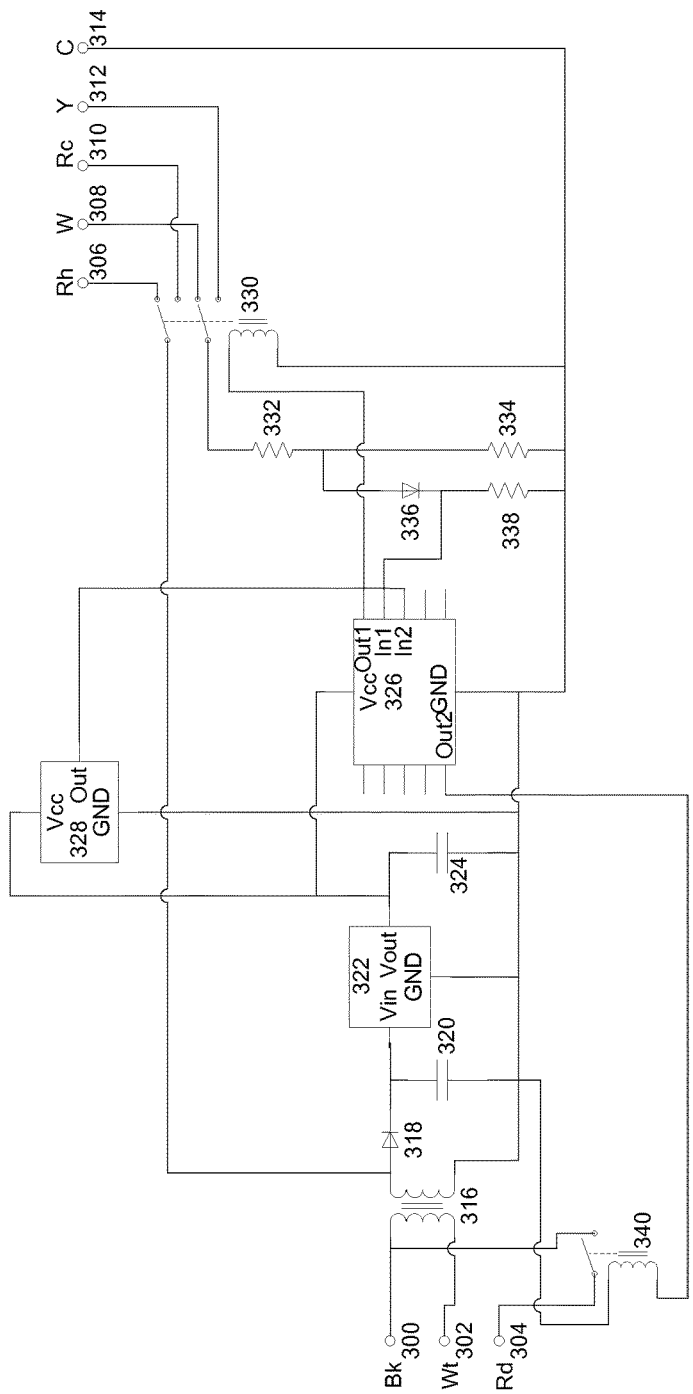
FIG. 3 shows the electrical schematic of one embodiment of the adapter.

FIG. 3 shows an electrical schematic of the adapter zoo. The terminals 300, 302, and 304 correspond to the wires 202, 204, and 206 in FIG. 2. The terminals 306-314 correspond to the connections on the terminal block 228 in FIG. 2.

The transformer 316 transforms mains voltage, typically 120 V, to the voltage used by the transformer to signal desired heating or cooling and optionally also to power the thermostat, typically 24 V. Diode 318, capacitors 320 and 324, and linear power regulator 322 comprise a regulated power supply to feed the temperature sensor 328 and the microcontroller 326. The output voltage of linear regulator 322 may be 5 V.

Microcontroller 326 is the core of the assembly's function. This may be a simple and cheap microcontroller such as a PIC manufactured by Microchip Technology Inc. of Chandler, Ariz. or an 8-bit AVR manufactured by Atmel Inc. of San Jose, Calif. The temperature sensor 328, which may be a LM 35 made by Texas Instruments Inc. of Dallas, Tex., is the functional part of the temperature sensor 224 in FIG. 2. If more advanced functions, such as network communications, are also desired, a more powerful microcontroller may be used instead. The microcontroller's power leads are connected to the stabilized power provided by the linear regulator 322, and its output lead is connected to an analog input lead of microcontroller 326, allowing the microcontroller to measure the temperature at the sensor.

Microcontroller 326 drives relay 330. If the microcontroller's maximum current output is sufficient to drive the relay, the relay may be connected directly to the microcontroller as shown in the schematic; if not, a bipolar transistor or MOSFET may be inserted as a driver. Depending on the microcontroller's and the relay's specifications, it may also be necessary to add a clamping diode in parallel to the relay to remove voltage spikes induced as the relay gets shut off Relay 330 is a double-pole, double-throw type. In its off position, its first pole connects the 24 V output of the transformer 316 to the Rh terminal 306, and its second pole connects the W terminal 308 to the resistor 332. If the microcontroller activates relay 330, these two terminals get disconnected and instead the Rc terminal 310 gets connected to the transformer and the Y terminal 312 gets connected to resistor 332. Alternatively, it is possible to use a bistable relay for relay 330, connected to two output pins of the microcontroller 326. This avoids wasting energy for keeping the relay energized at the expense of needing another microcontroller pin.

Resistor 332 and 334 form a voltage divider. The voltage reduced by this divider gets rectified by diode 336 and passed through resistor 338. The voltage so rectified gets sensed by an analog input port of microcontroller 326. The values of resistors 332 and 334 may be chosen so that their sum is approximately 2 k$\Omega$, so as to allow a current of approximately 10 mA, and their ratio may be approximately 9:1 so that the voltage seen by the microcontroller will not exceed its operating voltage. Resistor 338 may be large compared to resistor 334 since the microcontroller's input port has a very high impedance and so as not to disturb the symmetric waveform passing through the voltage divider.

Microcontroller 326 also controls relay 340, which is a single-pole single-throw relay capable of controlling the mains voltage and current the fan-coil unit is operating under. Like relay 330, it may be driven directly by the microcontroller or through a driver transistor, and addition of a clamp diode may be necessary. When relay 340 gets activated, the output terminal 304 gets connected to the hot wire coming from mains power, causing the fan-coil unit to run. Alternatively, relay 340 may also be driven by alternating current from transformer 316 driven by a TRIAC controlled by microcontroller 326; in this configuration a snubber circuit may be necessary as by the datasheet of the TRIAC chosen. The benefit of using an AC relay driven by the transformer is that with the full transformer voltage available a smaller current will suffice to drive the relay, allowing savings in dimensioning the transformer 316 and the regulated power supply around regulator 322.

In addition to the components shown, there may be additional components, such as a control light indicating the adapter's current operating state, fuses or current limiters, additional capacitors to suppress transients, etc.

The function of the adapter is implemented by the program stored in the microcontroller 326. Microcontroller 326 periodically polls the input port to which temperature sensor 328 is connected, reads the voltage being output by the temperature sensor, and converts it into a temperature reading by the conversion formula provided by the temperature sensor's manufacturer. In order to avoid spurious changeover detections, it passes these temperature readings through a low-pass filter. The microcontroller may take one reading each second and filter these readings by taking an exponential moving average (EMA) with a half-life time of one minute. The controller then applies a hysteresis control to switch between heating and cooling modes; it may switch to cooling mode whenever the EMA of the temperature reading at the incoming water pipe is below 17° C. and switch to heating whenever the EMA of the temperature reading is above 25° C.

Whenever the microcontroller's mode is set to cooling, it activates relay 330. This disconnects power from Rh and sets W to high impedance, and connects Rc to power and brings Y to low impedance. Conversely, if the microcontroller's mode is heating, Rh is connected to power, W is low impedance, Rc is disconnected from power, and Y is at high impedance.

When the thermostat requests heating, it closes a contact between Rh and W, and when it requires cooling it closes a contact between Rc and Y. When the thermostat activates the function that is appropriate for the current mode, i. e., when the current mode is cooling and the thermostat requests cooling or when the current mode is heating and the thermostat requests heating, this causes a current to flow through the voltage divider formed by resistors 332 and 334. This voltage gets rectified by diode 336 and sensed by the microcontroller's analog input connected to it. Since the thermostat voltage is alternating current, when the contact is closed the thermostat may or may not see voltage on any given poll. Thus, the microcontroller polls this voltage frequently, for example 100 times per second, and takes an exponential moving average of the voltage seen. The half-life of this EMA may be 0.1 s in order to filter out contact bouncing.

If the EMA of the voltage seen by the microcontroller 326 at the diode 336 exceeds a threshold value, the microcontroller powers relay 340. This provides power to the fan-coil unit and thus activates it, causing heating or cooling.

Figure 4:
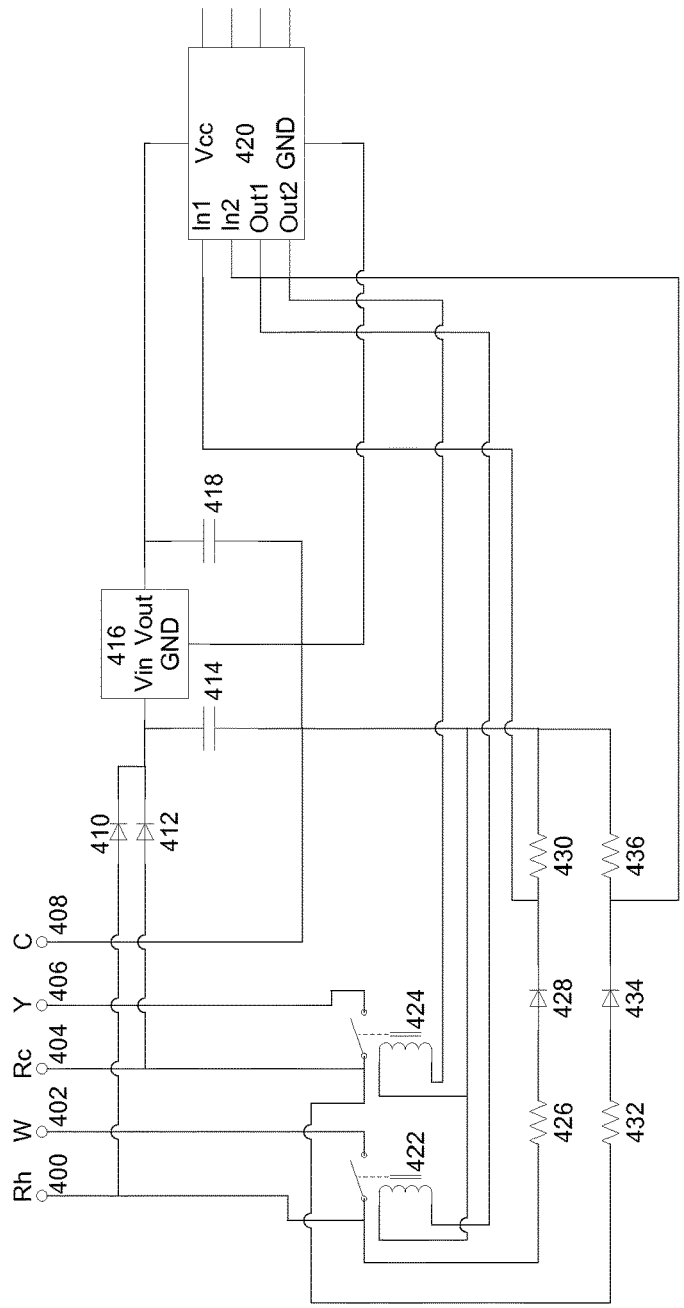
FIG. 4 shows a partial electrical schematic of a thermostat that can infer the current state of the fan-coil unit.

Thermostat Inferring Operating Mode—FIG. 4

The construction of the adapter makes it possible for the thermostat to infer whether the fan-coil unit is currently operating in heating or in cooling mode using just the standardized thermostat wires. When heat mode is switched on, terminal Rh carries voltage vs. terminal C, and terminal W is on low impedance. The same is true for terminals Rc and terminal Y, respectively, when the unit is in cooling mode. It may be useful for the thermostat to know the current state of the fan-coil unit. The thermostat may display the current state so as to make it clear to the user that despite the setpoints set on the thermostat requiring heating or cooling, the current state of the fan-coil unit is in the opposite function, and thus the required heating or cooling is not possible. Also, smart thermostats that plan ahead for the future may need to know whether heating or cooling is available so as to make an optimal plan.

The adapter's signaling mechanism allows two different ways for the thermostat to determine whether the fan-coil unit is currently in heating or in cooling mode:
a) The thermostat may test whether terminal Rh or terminal Rc are currently energized.
b) The thermostat may test the impedance of terminals W and Y.

Testing for energy on terminal Rh or Rc is slightly easier to implement than testing the impedance of terminals W and Y. However, testing the impedance of terminals W and Y may be easily extended to test additional terminals Y2 and W2, if equipped, for the availability of second-state heating, and so may be preferable for more universal self-configuring thermostats.

The thermostat may observe the availability of heating and cooling over time and infer from that what type of HVAC system it is connected to. If the thermostat has only ever seen heating available, it may conclude that it is connected to a furnace. If it has only ever seen cooling available, it may conclude that it is connected to an air conditioner. If it sees heating and cooling both available, it may conclude that it is connected to an HVAC system that offers both heating and cooling at the user's choice. If it sees heating and cooling available alternately, but not together, it may conclude that it is connected to a one- or two-pipe HVAC system with a fan-coil unit and an adapter as described above.

FIG. 4 shows a possible implementation of a thermostat that senses whether terminals Rh or Rc are powered. The thermostat uses power from Rh and Rc returned through terminal C for its own power supply, making batteries unnecessary. Diodes 410 and 412 provide rectified power from terminals Rh 400 or Rc 404 to the thermostat's built-in power supply unit. This power supply consists of capacitor 414, linear voltage regulator 416, and capacitor 418. The capacitors should be chosen large enough to keep powering the thermostat through brief power outages while power is being switched from Rh to Rc.

Microcontroller 420 is the core of the thermostat. In addition to the components shown, it is also connected to additional components not shown, including a temperature sensor, a display, and keys for user input. Microcontroller 420 can close relay 422 to connect terminal Rh 400 to terminal W 402, causing heating to be activated. In the same way, relay 424 can connect terminal Rc 404 to terminal Y 406, activating cooling.

Resistor 426, diode 428, and resistor 430 allow the thermostat to sense whether terminal Rh is being powered. The values of resistors 426 and 430 may be 100 k$\Omega$ and 10 k$\Omega$, respectively. The voltage divided by resistors 426 and 430 and rectified by diode 428 is observed by microcontroller 420. As above, the microcontroller uses an exponential moving average to smooth out the alternating current and relay clicks. Similarly, the microcontroller uses resistors 432 and 436 and diode 434 to sense whether cooling is available.

Again, additional parts not shown may be installed in the thermostat, such as driver transistors, fuses, overcurrent protection, a network interface, etc.

Conclusion

The reader will see that the adapter shown is much easier to install than existing solutions. The part of the adapter connected to mains voltage is exactly the same installation as is common for light switches, dimmers, etc., with which every electrician is intimately familiar, allowing rapid and simple installation. The adapter's terminals to connect the thermostat allow connection of almost any industry-standard low-voltage thermostat. The adapter senses whether the HVAC system is currently in heating or in cooling mode, and it will not turn on the fan-coil unit if heating is desired but the fan-coil unit is receiving chilled water or vice versa.

In addition, the adapter signals to the thermostat whether heating or cooling is presently available. This allows the thermostat to guide the user and display the current operating mode. It also allows a self-configuring thermostat to sense that is connected to a two-pipe system where heating and cooling are available alternately. The thermostat may use this information to set internal variables and to activate special functions. For example, an Internet-enabled thermostat may send a notification to its owner's cellular telephone that the semiannual changeover from heating to cooling has occurred.

Second Embodiment: Additional Fan Speeds

Some fan-coil units offer their users two operating speeds, typically called high and low. Similarly, many low-voltage thermostats can control two heating and cooling modes each, called Heat1, Heat2, Cool1, and Cool2. To control these modes, the thermostats have additional control wires Y2 and W2 in addition to the ones mentioned in the first embodiment. If the thermostat wants to set the first heating mode, it powers wire W. If it wants to set the second, stronger heating mode, it powers wire W2. The same goes for cooling with wires Y and Y2.

According to one embodiment, the adapter works as in the first embodiment, but is equipped with additional terminal connectors W2 and Y2. If terminal W, but not terminal W2, is powered and the adapter is in heating mode, it activates the fan-coil unit at low speed. If terminal W2 is powered and the adapter is in heating mode, it activates the fan-coil unit at high speed. The same logic applies if the adapter is in cooling mode and terminals Y or Y2 are powered. Connecting and disconnecting the additional terminals and sensing whether the high mode has been activated is accomplished analogously to the solution in the first embodiment, with the double-pole relay replaced by a triple-pole relay and an additional voltage divider and rectifier connected to an additional analog input pin on the microcontroller to sense whether the high heating or cooling stage is being signaled.

Fan-coil units capable of two operating speeds typically have two power input hot wires and a neutral wire, with the two hot wires corresponding to high and low operating mode. An additional output wire, and an additional relay, driven by an additional output pin of the microcontroller, may be added to the adapter from the first embodiment, and the microcontroller programmed to switch on the appropriate relay for the fan speed desired by the thermostat.

Third Embodiment: Continuously Variable Fan Speed

Some modern fan-coil units offer their users a continuously variable fan speed, typically selectable by setting a control voltage at a low current to between 0 and 10 V. In order to control such a fan-coil unit, the adapter from the first embodiment may be modified as follows: The relay 340 and the output wire 304 are omitted. Instead, an output port of the microcontroller is configured as an analog output port and connected to a bipolar transistor that translates the output voltage of the microcontroller to the appropriate voltage range for the fan-coil unit. If the microcontroller can directly generate the required control voltage, this transistor amplifier may be omitted. If the transistor amplifier is needed, a second linear power regulator may be used to generate the input voltage for this amplifier, which will typically be higher than the input voltage for the microcontroller. This output voltage is then fed to the fan-coil unit's control voltage input.

This embodiment may be combined with the two-speed signaling of the previous embodiment using additional signal lines. In this case, the first heating and cooling state may correspond to a fan control signal of 6 V, and the second stage to the full 10 V.

This embodiment may also ramp the fan-coil unit on and off softly. It can do so by taking an exponential moving average of the desired output voltage. The half-life time of this EMA may be one minute. This soft ramping reduces perceived noise from the fan-coil unit by avoiding suddenly going from fully off and silent to full operation with the concomitant noise.

Fourth Embodiment: Direct Current Signaling

The previous embodiments have used adapters equipped with transformers and relays where the power provided to the thermostat is typically 24 V AC and the thermostat signals its demand for heating or cooling by switching this signal to the signal wires W and Y, and additional wires if equipped with multiple heating or cooling stages. Although 24 V AC is the historically grown industry standard, most modern thermostats do not, in fact, depend upon the power provided to be alternating current. In the sixth embodiment, the transformer 316 of the first embodiment is replaced by a switching power supply providing 24 V DC. The relay 330 is replaced by bipolar transistors or MOSFETs. This arrangement allows for a reduced size, weight, and cost of the unit, as well as greater reliability from replacing an electromechanical relay with solid-state electronics. The terminals Rh and Rc, at the times when they are to be powered, are connected to +24 V DC, terminal C is connected to 0 V (i. e., the minus pole of the power supply) and the thermostat communicates the need to switch on heating or cooling by connecting the W or Y terminal, respectively, to +24 V DC from the Rh or Rc terminals.

Fifth Embodiment: Four-Pipe Fan-Coil Unit with Auto Changeover

The previous discussion, in particular the details of the circuit for the first embodiment, primarily had two-pipe fan-coil units, the more common type, in mind. The electronics for one-pipe fan-coil units can be the same as for two-pipe installations. If a four-pipe fan-coil unit has a manually actuated changeover valve, the same electronics and control logic as for a two-pipe unit may be employed, too, the only difference being that the manual changeover is local for a specific fan-coil unit instead of happening for the entire building at once.

If the four-pipe fan-coil unit has an electrically actuated changeover valve, however, the electronics need to change a little bit. In this case, heating and air conditioning are both, at least in principle available permanently, so the temperature sensor and the signaling of the available function are unnecessary. However, an additional relay and external connections is needed to actuate the changeover valve. In most configurations, the fan-coil unit will have one lead that if energized forces the changeover valve into heating mode and one lead that will force the changeover valve into cooling mode. Thus, the adapter needs two more leads to connect to the fan-coil unit, one for heating mode and one for cooling mode. Relay 330 becomes superfluous, but a new single-pole double-throw relay will be necessary that connects the main power connector 330 either to the heating or to the cooling actuation lead of the fan-coil unit. If the thermostat demands heating, the adapter will energize the heating lead as well as the fan lead 304. If the thermostat demands cooling, the adapter will energize the cooling lead as well as the fan lead. This relay may also be of a bistable type to save power for keeping it energized.

CONCLUSION, RAMIFICATIONS, AND SCOPE

Accordingly, the reader will see that the various embodiments of the thermostat adapter make it possible to connect an industry-standard, low-voltage thermostat easily and cheaply to control a fan-coil unit. Some embodiments add additional features like multi-stage fan actuation, continuously variable fan speeds, or DC signaling. The features of the various embodiments disclosed may be combined as desired for a given application, and additional features, such as external displays, may be added.

Although the description above contains many specificities, these should not be construed as limiting the scope of the embodiments but as merely providing illustrations of some of several embodiments. For example, mechanical relays may be replaced by solid-state electronic switches.

Thus the scope of the embodiments should be determined by the appended claims and their legal equivalents rather than by the examples given.

I claim:

1. A thermostat adapter, comprising:
   a power input connection for receiving electric power having a voltage of at least 60 volts,
   a power output connection for a voltage of at least 60 volts for providing operating power to an HVAC system capable of operating in at least one heating mode and at least one cooling mode,
   a thermostat signal input connection for receiving a signal having a voltage of less than 60 volts from a thermostat,
   a sensor for sensing an operating condition of said HVAC system,
   an electronically actuated switch for connecting said output connection to said power input connection, and
   a control circuit;
   wherein said control circuit is configured to:
   receive said signal from said thermostat signal input connection,
   decode said signal into a desired operating mode of said HVAC system,
   sense said operating condition of said HVAC system by using said sensor;
   compare said desired operating mode with said operating condition,
   set said power output connection to an ON state by setting said switch to an ON state if said desired operating mode is heating and said operating condition indicates said HVAC system to be capable of heating in the present operating condition;
   set said power output connection to an OFF state by setting said switch to an OFF state if said desired operating mode is heating and said operating condition indicates said HVAC system to be incapable of heating in the present operating condition;
   set said power output connection to an ON state by setting said switch to an ON state if said desired operating mode and said operating condition indicates said HVAC system to be capable of cooling in the present operating condition, and
   set said power output connection to an OFF state by setting said switch to an OFF state if said desired operating mode is cooling and said operating condition indicates said HVAC system to be incapable of cooling in the present operating condition.

2. The adapter of claim 1, further comprising an electrically insulating enclosure.

3. The adapter of claim 1, further comprising an electrically conductive enclosure with a ground connection.

4. The adapter from claim 1 where said HVAC system is a fan-coil unit.

5. The adapter of claim 1 where said sensor is a temperature sensor for measuring the temperature of a thermal transfer medium used by said HVAC system to transfer heat to or from ambient air.

6. The adapter of claim 1, where said thermostat signal input connection comprises at least one wire for signaling a desired operating mode of heating and at least one other wire for signaling a desired operating mode of cooling, and
   said adapter is configured to provide on said thermostat signal input connection a voltage of less than 60 volts to at least one of said at least one wire for signaling a desired operating mode of heating and said at least one other wire for signaling a desired operating mode of cooling, and
   an observation of a reduced impedance on said wire for signaling a desired operating mode of heating indicates a request for the operating mode of heating, and
   an observation of a reduced impedance on said wire for signaling a desired operating mode of cooling indicates a request for the operating mode of cooling.

7. The adapter of claim 6, wherein said adapter is configured to:
   provide said voltage of less than 60 volts to said signal wire for signaling a desired operating mode of heating and not provide said voltage to said signal wire for signaling a desired operating mode of cooling, when said HVAC system is capable of providing heat but not capable of providing cooling, and provide said voltage of less than 60 volts to said signal wire for signaling a desired operating mode of cooling and not provide said voltage to said signal wire for signaling a desired operating mode of heating when said HVAC system is capable of providing cooling but not capable of providing heat.

* * * * *